Feb. 21, 1939.　　　　S. A. SCHELKUNOFF　　　　2,147,717
GUIDED WAVE TRANSMISSION
Filed Dec. 31, 1935　　　　6 Sheets-Sheet 1

FIG. 1

FIG. 2
CM WAVE FIRST MODE

FIG. 3
CM WAVE SECOND MODE

INVENTOR
S. A. SCHELKUNOFF
BY
*J. H. Burgess*
ATTORNEY

Feb. 21, 1939. S. A. SCHELKUNOFF 2,147,717
GUIDED WAVE TRANSMISSION
Filed Dec. 31, 1935 6 Sheets-Sheet 2

FIG. 4

CE WAVE
SECOND MODE

INVENTOR
S. A. SCHELKUNOFF
BY *J. A. Burgess*
ATTORNEY

Feb. 21, 1939.   S. A. SCHELKUNOFF   2,147,717
GUIDED WAVE TRANSMISSION
Filed Dec. 31, 1935   6 Sheets-Sheet 4

INVENTOR
S. A. SCHELKUNOFF
BY
*K. A. Burgess*
ATTORNEY

Feb. 21, 1939.   S. A. SCHELKUNOFF   2,147,717
GUIDED WAVE TRANSMISSION
Filed Dec. 31, 1935   6 Sheets-Sheet 6

INVENTOR
S. A. SCHELKUNOFF
BY
ATTORNEY

Patented Feb. 21, 1939

2,147,717

UNITED STATES PATENT OFFICE 2,147,717

GUIDED WAVE TRANSMISSION

Sergei A. Schelkunoff, New York, N. Y., assignor to Bell Telephone Laboratories, Incorporated, New York, N. Y., a corporation of New York Application December 31, 1935, Serial No. 56,959

9 Claims. (Cl. 178—44)

This invention relates to the transmission of electromagnetic waves along dielectric guides.

An object of the invention is to provide an improved type of guided wave transmission system, to increase the efficiency with which waves are transferred to and from a dielectric guide and its associated terminal circuits, and to reduce the attenuation of the guided waves.

Another object of the invention is to effect the multiplex two-way transmission of signals over a dielectric guide.

A further object of the invention is to provide a combined conduction current transmission system and a guided wave transmission system.

Other objects, features and advantages of the invention will appear in the following description of several specific embodiments. The scope of the invention is indicated in the appended claims. In the accompanying drawings.

The type of transmission system with which the present invention is concerned is one in which electromagnetic waves are propagated along or within a dielectric guide. The term "dielectric guide" as employed in this specification applies to a wide variety of structures. The guide may be, for example, simply a rod of some material such as fused quartz having a dielectric constant greater than unity and a low power factor, or it may comprise a rod of dielectric material sheathed with conducting material such as copper or it may comprise a hollow conductor. All of these guides are characterized by a dielectric discontinuity laterally surrounding the medium in which the waves are propagated. Other specific types of guides are disclosed in the copending applications for patent bearing Serial Nos. 661,154 and 701,711, filed by G. C. Southworth on March 16, 1933, and December 9, 1933, respectively, and to those skilled in the art other types will be obvious from a consideration of the character of the waves transmitted.

The waves propagated along a dielectric guide travel at a high velocity and except for losses in the guide are self-sustaining. The component electric and magnetic fields are always in space and time quadrature at any considerable distance from their point of application to the guide, but within this limitation several distinctly different types of waves are possible as will be shown hereinafter.

Typical guided wave system

Figure 1:
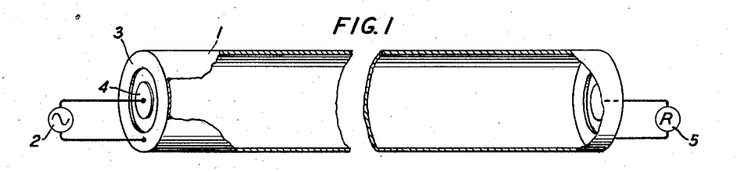
Fig. 1 represents schematically a typical dielectric guide transmission system.

A typical system for generating and propagating one of these several types of guided electromagnetic waves is illustrated in Fig. 1. The particular guide chosen for purposes of illustration comprises a tubular copper conductor 1, evacuated or filled with air. Among other advantages it has the merit that dielectric losses are nil and interference with adjacent signaling systems is negligible. The source of waves 2 may for present purposes be considered as a high frequency sine wave generator, although it is also representative of any suitable source of signaling waves such as a wide-band carrier telephone or television terminal. To introduce the waves from the generator into the guide, electrodes 3 and 4 may be employed. Electrode 3 is shown as an annular plate of copper disposed at right angles to the axis of the guide and conductively connected around its outer periphery to the tubular conductor 1. Electrode 4 is a disc of copper concentric and coplanar with the outer electrode 3. Similar electrodes may be employed at the other end of the guide for converting the guided waves into a form suitable for operating the receiver or detector 5.

Types of waves

The waves transmitted along a dielectric guide may be classified into two general types: "Transverse magnetic" and "transverse electric." Transverse magnetic waves, hereinafter abbreviated TM, are characterized by the fact that the vector H representing the magnetic component of the field lies transversely to the direction of propagation. Transverse electric waves, hereinafter abbreviated TE, are characterized similarly by the fact that the vector E representing the electric component lies transversely to the direction of propagation.

The waves set up in the guide when a system such as shown in Fig. 1 is employed are transverse magnetic waves. The lines of magnetomotive force are circular, coaxial with the guide and lie in planes orthogonal to the axis of the guide. The lines of electromotive force are roughly elliptical and lie in axial planes. The two component fields are depicted in Figs. 2 and 2A, where the dotted lines represent lines of magnetic force and the solid lines represent lines of electric force.

To any wave, such as this one, that is characterized by a magnetic field the lines of which are circular, coaxial with the guide and lie in planes orthogonal to the axis of the guide, the special designation "circular magnetic" is applied. Circular magnetic, hereinafter abbreviated CM, is used also in a broader sense to include TM waves the magnetic field of which is neither strictly circular nor strictly coaxial with the guide. The distinguishing characteristics of CM waves in this broader sense will be apparent from a consideration of the types of waves to which this term is hereinafter applied.

Figure 2:
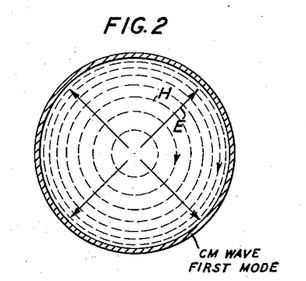
Figs. 2 to 6, inclusive, are diagrams showing the field pattern transverse to the axis of the guide for various kinds of guided waves.
Figure 2A:
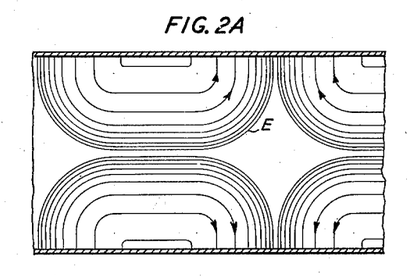
Figs. 2A, 3A and 4A show diagrammatically corresponding axial field patterns.
Figure 2B:
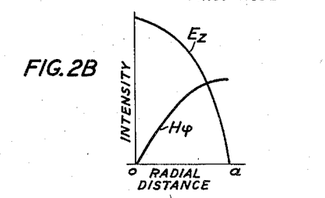
Figs. 2B, 3B, 4B, 5A and 6A are curves showing the variation in field intensity transverse to the axis of the guide.

Substituting for the electrodes shown in Fig. 1 another type of terminal structure discussed in a subsequent portion of this specification, a wave may be produced that is the converse of the circular magnetic wave depicted in Figs. 2 and 2A in that the lines of electric intensity are circular, coaxial with the guide and lie in planes orthogonal to the axis of the guide, and the lines of magnetic intensity are elliptical and lie in planes perpendicular to the wave front. This new wave is generically a transverse electric wave but it is herein given the special appellation "circular electric", or CE, as abbreviated. The term "circular electric" is used also in a broader sense in the same manner that the term "circular magnetic" is used.

The two component fields of the simplest kind of CE waves in a tubular metallic guide are depicted in Figs. 4 and 4A, where again dotted lines are used to represent lines of magnetic force and solid lines to represent lines of electric force.

Modes of propagation

Figure 3:
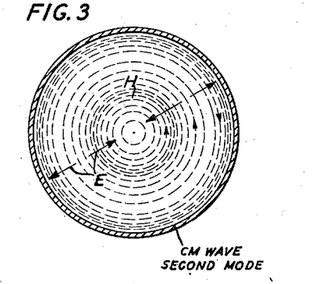
Figure 3A:
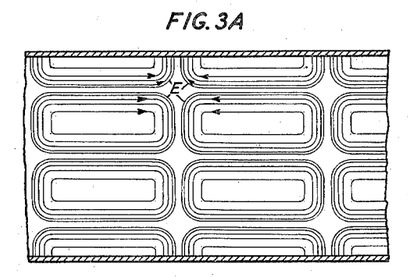
Figure 3B:
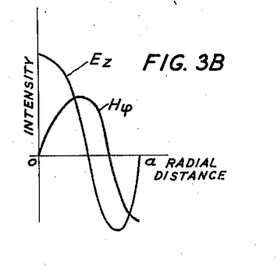
Figure 4:
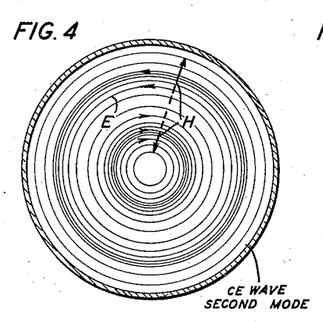
Figure 4A:
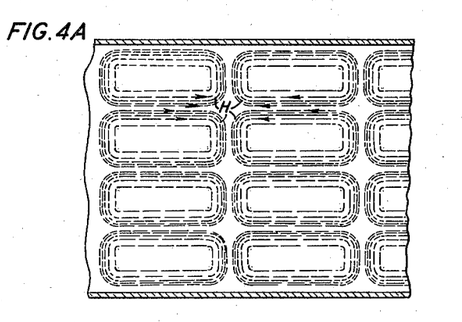

Each of the four kinds of waves thus far identified is capable of transmission in a theoretically infinite number of "modes". The fundamental, or first, mode is characterized by a single circular node which, in the case of the TM wave shown in Fig. 2 is a node of electric displacement. Modes of higher degree are characterized by a plurality of nodes. Thus, the second mode for a TE wave shows, as illustrated in Figs. 4 and 4A, two circular nodes of magnetic displacement; and for a TM wave, as illustrated in Figs. 3 and 3A, two circular nodes of electric displacement. In terms of radio transmission, a wave of first or higher mode corresponds to a harmonic of the fundamental frequency of an antenna.

The nature of the waves and the relation of the manner of propagation to frequency and other factors may be better comprehended by considering a simple analogy. A stretched elastic membrane is capable of natural vibration in a great variety of modes, each having a characteristic frequency. The form of the nodal pattern depends in part on the condition at the periphery of the membrane, that is, on whether the periphery is fixed or free. Similarly, a dielectric rod, or each membranous section thereof, is capable of electromagnetic vibration in many different modes. In this case, the nodal pattern depends in part on the condition at the periphery of the dielectric, that is, on whether or not the dielectric is surrounded by a conducting sheath. Suppose now that there be applied to one end of the dielectric rod an exciting field, the frequency of which is below the lowest natural frequency of the rod or of each membranous section thereof. No wave will be transmitted. As the frequency is increased through the lowest natural frequency a wave travels down the rod maintaining in its cross-section the pattern of that particular mode. The wave-length along the rod will depend on the driving frequency. As the frequency increases through another natural frequency, transmission becomes possible in either or both of the two modes. The distribution of energy between the two modes will depend on the form of the exciting field. That is, by suitable design of the terminal electrodes the generation of any particular mode or modes can be facilitated.

Order of propagation

The mode of propagation indicates the number of concentric annular regions into which the waves in a dielectric guide of circular cross-section naturally divide. A further natural division in a circumferential direction is also possible. In this latter case a cross-sectional plot of the field would show groups of closed lines of force lying wholly within respective sectorial portions of the guide. In a wave of $n$-th order the sectors are $2\pi/n$ in arcuate width; in a wave of sixth order, for example, therefore, the waves divide into six sectorial portions of the guide. Where both mode and order are of higher degree than zero the waves are virtually separated into small compartments, each a sectorial portion of an annulus.

The term "sectorial wave" is used in this specification to describe any guided wave in which the above-described separation into sectorial regions takes place. A more accurate mathematical definition appears at a later point in this specification. Both TM and TE sectorial waves are possible.

Figures 4B, 5, 5A, 6, 6A:
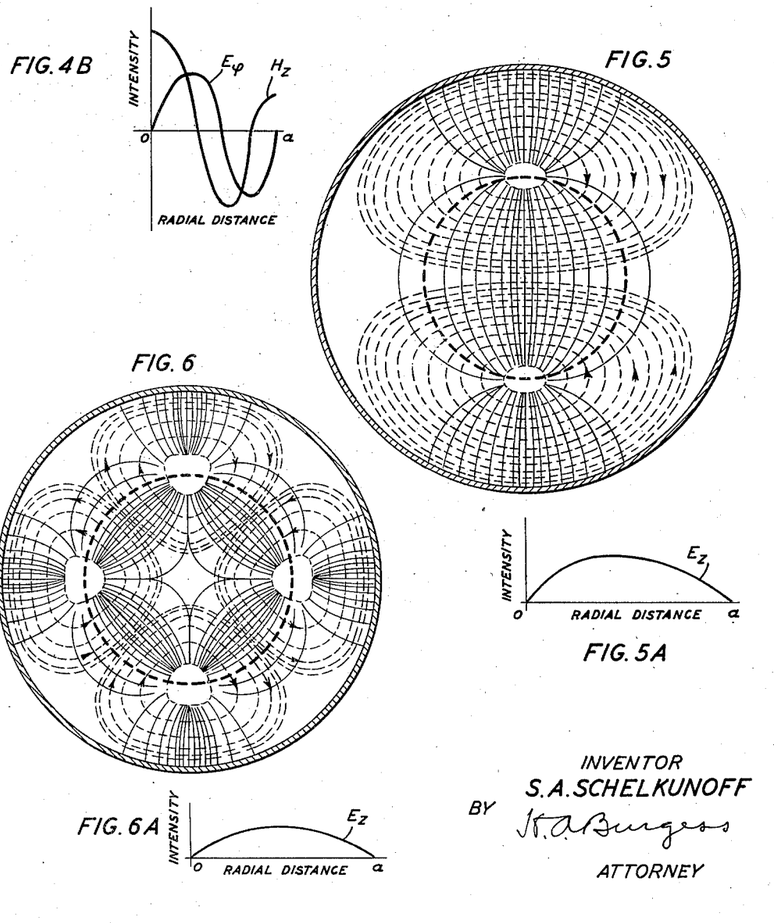

In Fig. 5 is represented the magnetic and electric fields of the simplest sectorial wave, a transverse magnetic wave of the first order traveling in the first mode.

Fig. 6 shows the respective fields of a transverse magnetic wave of the second order traveling in the first mode.

A mathematical-physical study of the dielectric guide yields valuable information concerning its transmission characteristics, and with the knowledge thus derived it is possible to modify and improve the design of dielectric guide transmission systems.

General analysis

Consider a perfectly conducting tube filled with a perfect dielectric. If a variable potential difference is applied between the conductor and an electrode or several electrodes immersed in the dielectric, displacement currents flowing in the dielectric will be continued as conduction currents in the tube. Sufficiently far from the electrodes local pecularities of current distribution will subside and attention can be fixed on the longitudinal currents flowing in one direction in some parts of the guide and in the opposite direction in other parts.

Certain amounts of magnetic and electric energy, that is, certain virtual series inductance and capacitance are associated with this current. Then, there are transverse currents flowing through an effective distributed shunt capacitance and completing current paths in closed curves. From the transmission point of view, the structure consists of distributed series inductance, series capacitance and shunt capacitance. Such a structure is a high-pass filter with the cut-off frequency $f_c$ determined by the condition of resonance between series inductance and capacity; thus, $$f_c = \frac{1}{2\pi\sqrt{LC}}$$

Obviously, L and C depend upon the particular distribution of longitudinal current throughout the cross section of the guide. Because of electrodynamic reactions there will be some distributions of current which are stable and thus able to preserve themselves, and some unstable. Hence, a sequence of possible stable waves with appropriate cut-off frequencies can be expected.

Consider now more closely the field inside the conducting tube, fixing attention on longitudinal currents and transverse potential differences, either electric or magnetic, depending on whether the wave is transverse magnetic or transverse electric. There being no longitudinal magnetic flux in a transverse magnetic wave, the electromotive force in any circuit lying completely in the wave front is zero and there exists a definite potential difference between any two points in the same wave front. This distributed potential difference accounts for the flow of electric current. Similarly, in a transverse electric wave, a sort of effective transverse magnetomotive force drives magnetic current, magnetic current here being understood as the time rate of change of magnetic flux.

Figure 7:
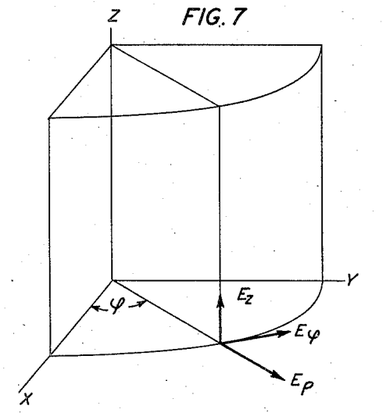
Figs. 7, 8 and 9 are diagrams and curves utilized in the analysis of guided wave transmission.

Consider now for the sake of simplicity a circular tube. The electric current density J is a periodic function of the longitude $\varphi$ (Fig. 7) and can be represented therefore by a Fourier series. A typical term of this series in $J_n \cos n\varphi$, where $J_n$ is a factor taking care of the density change in the radial direction. The component wave corresponding to this term will be called a sectorial wave of order $n$ and any general disturbance will be regarded as a resultant of a finite or an infinite number of sectorial waves.

In the special case when $n=0$, the current distribution is symmetrical about the axis and the lines of either electromotive intensity or magnetomotive intensity are coaxial circles. These waves possess circular symmetry and are called respectively, circular electric and circular magnetic, as hereinbefore explained.

Figure 8:
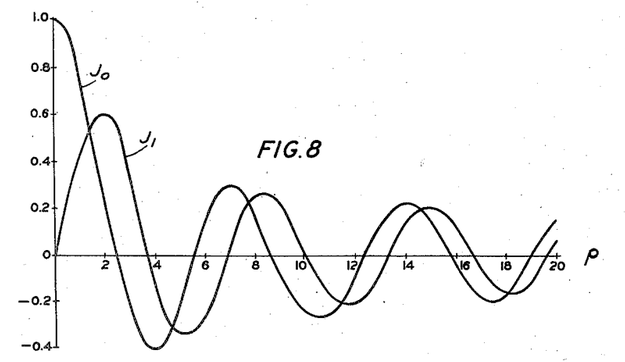
Figure 9:
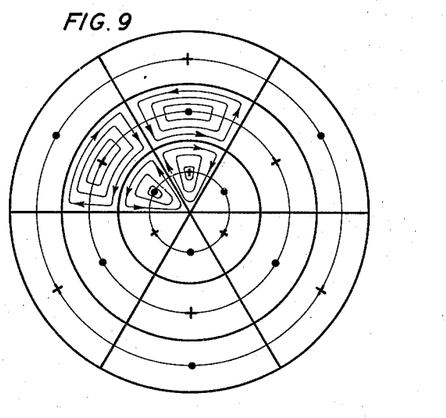

The factors $J_n$ governing the distribution of current in the radial direction are Bessel's functions $J_n(\chi\rho)$, of the first kind and of order $n$, two of which are shown graphically in Fig. 8, $\chi$ being a coefficient hereinafter defined (Equation 2.1) and $\rho$ being the distance of a given point from the reference axis. In a TM wave the longitudinal electric current density is proportional to $J_n(\xi_m\rho/a) \cos n\varphi$ where $\xi_m$ is the $m$-th positive root of $J_n(\xi_m)=0$ and $a$ is the radius of the tube. In a TE wave the longitudinal magnetic current density is proportional to $J_n(\xi_m\rho/a) \cos n\varphi$ where $\xi_m$ is the $m$-th positive root of $J_n'(\xi_m)=0$. In either case $n$ is the order of the wave and $m$ the mode. If the skin of the guide is perfectly conducting, the longitudinal electromotive intensity and the current density vanish in the immediate neighborhood of the skin. This means that $\chi a$ must be such that $J_n(\chi a)=0$, that is, that $\chi a$ must coincide with one of the intersections—$k_m$ for example—of the curve $J_n(\chi\rho)$ with the $\rho$-axis. Henceforward, this fact shall be described by saying that the wave is traveling in the $m$-th mode. To each intersection on the left of $k_m$ there corresponds a cylindrical surface on which the current density vanishes. The density vanishes also on $2n$ meridian half-planes where $\cos n\varphi=0$. The entire wave is divided therefore into $2nm$ compartments or cells in which the current flows alternately in opposite directions as shown in Fig. 9.

In each cell there is a straight line, the "axis of the cell", where the current density is maximum. Around this axis follow the lines of magnetomotive intensity in TM waves and lines of electromotive intensity in TE waves. Right on the axis the transverse field components vanish altogether and no energy flows there in the direction of the tube. The axes of the cells form a system of quasi-conductors, a kind of "parallel wires" guiding the waves.

The essential features of this picture of waves traveling inside of a hollow tube remain the same irrespective of the cross-sectional shape of the tube. In a transverse magnetic wave the electric potential must vanish on the conducting tube and its distribution throughout the cross-section can be represented by a vibrating membrane clamped along the edge. On the other hand, the magnetic potential in a transverse electric wave does not have to be constant on the surface of the tube; the latter, being a magnetic non-conductor, prevents magnetic current from entering the tube and the normal derivative of the potential must vanish on its surface. The distribution of the magnetic potential in the transverse electric wave is therefore like that of the excess pressure in an air wave, traveling in a tube with a perfectly rigid wall. The only difference is that magnetic current must have a return path, and hence it can never be uniformly distributed throughout the cross-section of the tube.

The variation in field intensity over the cross-section of the waves represented in Figs. 2, 3, 4, 5 and 6 is shown in Figs. 2B, 3B, 4B, 5A and 6A, respectively, the subscript $z$ indicating a field component parallel to the axis of the guide and the subscript $\varphi$ a circumferential field component. With respect to time the magnetic and electric potential of any point within the guide varies in the same manner as the waves applied to the terminal structure, sinusoidally, therefore, in the case of an applied sine wave.

The herein described properties of sectorial waves are utilized in accordance with one feature of the present invention to permit multiplex transmission in different sectorial portions of a dielectric guide. It has been shown that a sectorial wave of order $n$ is naturally divided, or may be thought of as being so divided, into $n$ sectorial compartments of the guide. Along the radial boundaries of each compartment the longitudinal field intensity is zero hence conducting material may be placed along these boundaries without interfering with the propagation of the waves.

It is proposed, in accordance with one phase of this invention, to incorporate in a wave guide two or more conducting partitions lying along radial planes passing through the axis of the guide in such manner as to form a plurality of identical sectorial compartments. In each compartment may be independently propagated a wave similar in all respects to one component of a sectorial wave having an order equal to the number of physically bounded compartments in the guide. Each of these independent waves may be differently modulated with signals for the transmission of intelligence or left unmodulated and utilized for other purposes.

Figure 10:
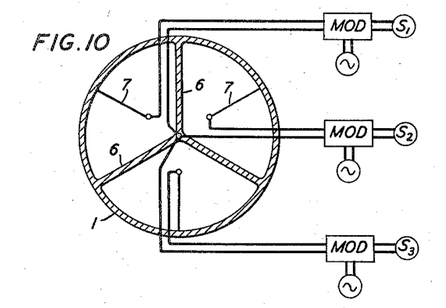
Figs. 10 to 14 and 16 show dielectric guides and cables of other than simple circular cross-section.

Fig. 10 shows a system embodying this last-discussed feature of the invention. The tubular, copper guide 1 is divided by three symmetrically disposed radial partitions 6, which may be, for example, also of copper. Each compartment is provided with a suitable terminal structure comprising in the specific example illustrated a symmetrically disposed radial wire 7 one end of which is, or may be, connected to the guide and the other end of which extends nearly to the opposite boundary of the compartment. Between the other end of each wire and the junction of the partitions is connected a respective source of high frequency waves, comprising, for example, a modulator MOD, an associated signal source $S_1$, $S_2$, $S_3$, and a carrier frequency generator. The showing of the connections from the modulators to the guide is purely diagrammatic; preferably these connections are brought out parallel to the axis of the guide.

Figure 11:
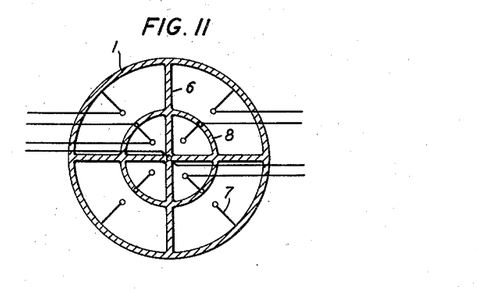

In waves of higher mode than the fundamental, it has been shown that there exists circular, or tubular, regions where the field intensity, electric or magnetic, is zero. A circular guide may be divided by concentric tubular conducting partitions each lying in such a tubular region of zero field intensity to form a plurality of annular regions for the independent propagation of different waves. As a further modification a circular guide may be provided, as illustrated in Fig. 11, with both radial partitions 6 and circumferential partitions 8 and each compartment thereby formed used for guided wave transmission. In Fig. 11 the terminal structure for each compartment comprises a radial wire 7 which may be connected to a respective signaling source in the same manner that the radial wires of Fig. 10 are connected.

Figure 12:
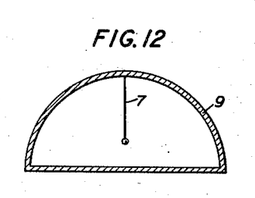

In view of the fact that each of the compartments of a sub-divided guide is capable of transmitting waves wholly independent of the waves transmitted in other compartments, it is entirely feasible to construct wave guides of such compartmental cross-section. Thus, in Fig. 12 is shown a guide 9 of semi-circular cross-section. One outstanding advantage of sectorial guides is that for the transmission of a given frequency the guide may be of lesser cross-sectional area than a tubular guide. That is, the cut-off frequency of the sectorial guide, for a given field pattern, is the same as that of a tubular guide of the same radius.

Figure 13:
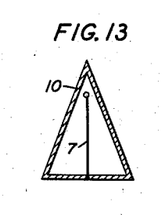
Figure 14:
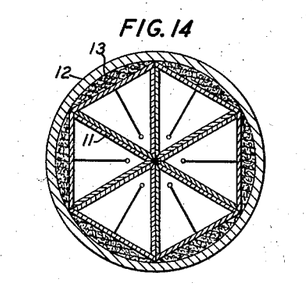

Various modifications of the sectorial guide are possible. For example, as shown in Fig. 13, the guide 10 may be triangular in cross-section. In Fig. 14 is represented a plurality of independent equilateral triangular guides 11 assembled to form a compact structure that is well adapted for use as a multi-guide cable. The assemblage may be covered with an extruded lead tube 12 and suitable packing material provided in the interstices 13.

Figure 24:
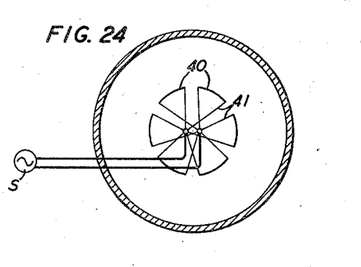
Figs. 24, 25, 26 and 26A represent terminal structures adapted for use with circular electric waves.
Figure 25:
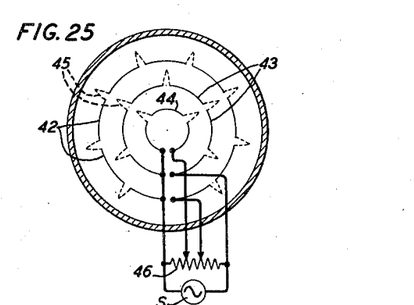
Figure 26:
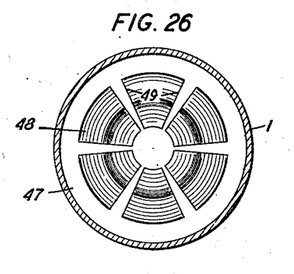

Although the guides represented in Figs. 10 to 14, inclusive, are shown with terminal structures adapted for the generation of TE waves, structures of any suitable type such, for example, as shown in Figs. 24 to 26, configured in accordance with the desired nodal pattern, may be substituted to permit the transmission of TM waves.

Figures 15, 16, 17:
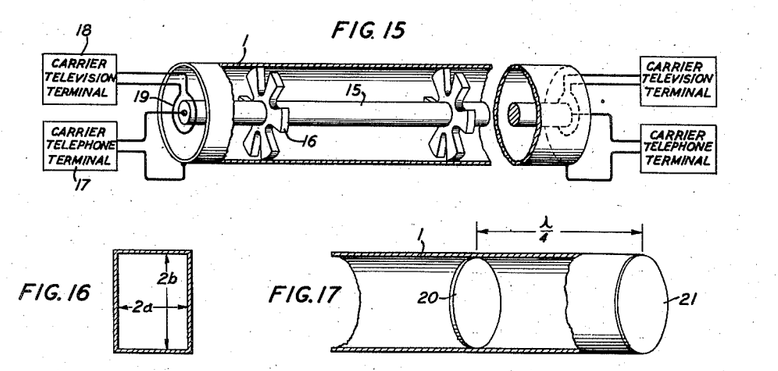
Fig. 15 shows a composite dielectric guide and conduction current transmission system.
Figs. 17 and 18 show reflectionless terminations for dielectric guides.

The fact that in a guided wave there may exist axial regions of zero longitudinal electric intensity may be utilized to provide a combined guided wave and conduction current transmission system. An illustrative combined system is shown in Fig. 15. In the system shown, conducting tube 1 and a coaxial conducting wire 15 maintained in position by means of washers 16 are connected to a carrier telephone terminal 17 as an ordinary coaxial conductor system. A carrier television terminal 18 is connected to a guided wave terminal structure 19 adapted to produce CE waves within the conducting tube 1. The guided wave longitudinal electric field intensity is zero along the axis of the guide, hence the presence of the conductor in this region does not affect the propagation of the guided wave. At the distant end of the system are provided terminal structures and circuits identical with those at the proximate end.

Figure 28:
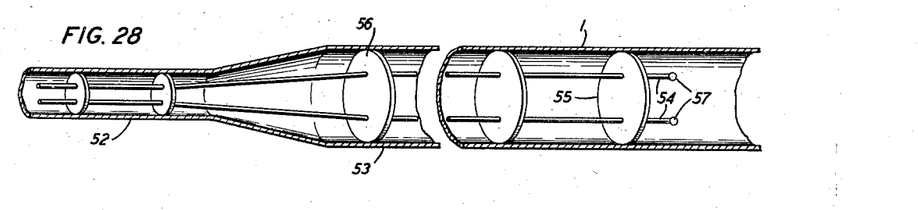

In guided waves of higher order a plurality of regions or axes of zero longitudinal electric intensity exist and the number of conductors may correspondingly be increased to provide a multi-conductor wire transmission system within the wave guide. Fig. 28 is illustrative.

Cut-off frequencies

The conception of a dielectric guide as a high-pass filter implies the existence of a cut-off frequency, at which propagation of waves through the guide begins to take place and below which no energy is transmitted.

The number of cut-off frequencies for a given guide is infinite; there is one for each mode of propagation. The critical frequency for any particular mode is proportional to the velocity of light in the dielectric filling the guide and inversely proportional to the square root of the cross-sectional area, the coefficient of proportionality depending upon the shape of this area and the particular mode of propagation.

If the cross-sectional area equals that of a circle of unit radius, (1) $$\omega_c = kv$$

The constant $k$ will be called a modular constant; $\omega_c = 2\pi f_c$ and $v$ is the velocity of light in free space. For any tube enclosing a cross-sectional area $S$ (2) $$\omega_c = \frac{kv\sqrt{\pi}}{\sqrt{S}}, = k\sqrt{\frac{\pi}{\mu\epsilon S}} \text{ and } f_c = \frac{kv}{2\sqrt{\pi S}}$$

At times another constant $\chi$, expressing the effect of both the shape and the size of the tube will be found convenient. It is related to the modular constant as follows:

(2.1) $$\chi = k\sqrt{\frac{\pi}{S}}$$

so that (2.2) $$\omega_c = \chi v$$

These equations are valid for all modes of propagation and for waves of either transverse magnetic or transverse electric types.

In a circular tube, $$S = \pi a^2 = \frac{1}{4}\pi d^2$$

and (2.3) $$\omega_c = \frac{kv}{a}$$

In this case the modular constants are roots of $J_n(k) = 0$ for TM waves and of $J_n'(k) = 0$ for TE waves. For convenience, these constants are scheduled below. The lowest value $k = 1.84$ is for transverse electric waves of the first order traveling in the first mode.

*Transverse magnetic waves in circular tubes*

| order \ Mode n \ m | 1 | 2 | 3 | 4 |
|---|---|---|---|---|
| 0 | 2.40 | 5.52 | 8.65 | 11.79 |
| 1 | 3.83 | 7.02 | 10.17 | 13.32 |
| 2 | 5.14 | 8.42 | 11.62 | 14.80 |
| 3 | 6.38 | 9.76 | 13.02 | 16.22 |

*Transverse electric waves in circular tubes*

| order \ Mode n \ m | 1 | 2 | 3 |
|---|---|---|---|
| 0 | 3.83 | 7.02 | 10.17 |
| 1 | 1.841 | 5.332 | 8.536 |
| 2 | 3.054 | 6.705 | 9.965 |
| 3 | 4.201 | 8.015 | 11.344 |

Dielectric guides of other than circular cross-sections, it has been shown, are entirely feasible. Consider first a dielectric guide of rectangular cross-section, illustrated in Fig. 16. All the modular constants for a rectangular tube of dimensions $2a$ by $2b$ are represented by the following formula (2.4) $$k = \sqrt{\pi\left(\frac{b}{a}m^2 + \frac{a}{b}n^2\right)}$$

For transverse magnetic waves neither $m$ nor $n$ can be equal to zero but for transverse electric waves either quantity, but not both, can assume the zero value. The reason for these restrictions will be obvious at once from the fact that the current distribution for the wave traveling in $(m,n)$-mode is (2.5) $$\frac{\sin}{\cos}\left(\frac{m\pi x}{2a}\right)\frac{\sin}{\cos}\left(\frac{n\pi y}{2b}\right)$$

where the sines are to be taken for TM waves and the cosines for TE waves. If either $m$ or $n$ equal zero in the first case the current density becomes zero everywhere and nothing happens. In the second case the simultaneous vanishing of $m$ and $n$ means a uniform distribution of magnetic current throughout the entire cross-section and no provision for a return path.

The lowest cut-off corresponds to the smallest modular constant. For transverse electric waves in a rectangular tube this is (2.6) $$k = \sqrt{\pi p}$$

where the shape factor $p$ is the ratio of the shorter side $2b$ to the longer side $2a$. The cut-off frequency is then (2.7) $$f_c = \frac{v}{4a}$$

and is seen to be independent of the length of the shorter side.

Elliptic tubes were treated by R. C. Maclaurin in his paper "On the Solution of the Equation $(\nabla^2 + K^2)\psi = 0$ in Elliptic Coordinates and their Physical Applications" published in the Transactions of the Cambridge Philosophical Society, vol. 17, 1898. From his table of the products of $\chi$ (Maclaurin uses K) by the length of the semi-major axis, it is observed that if the major axis of the ellipse is kept constant, the variation of the lowest cut-off frequency with the shape of the ellipse, that is, with the length of the minor axis, is very small.

Since for rectangular tubes the lowest cut-off is independent of the lengths of the shorter sides and for elliptic tubes almost independent of the lengths of the minor axes, it is easy to infer that for oval tubes, intermediate between elliptic and rectangular, the shape factor is quite unimportant.

From Equations (2.3) and (2.6) it is found that the ratio of the lowest cut-off for a rectangular tube to that for a circular tube of the same cross-sectional area is $$\frac{\sqrt{p\pi}}{1.84}$$

Thus, on the basis of equal areas all rectangular tubes are capable of transmitting longer waves than circular tubes.

On the basis of equal perimeters, the corresponding ratio of the cut-off frequencies is $$\frac{(1+p)}{1.84}$$

this ratio is seen to be somewhat greater than unity for nearly square tubes and less than unity for oblong shapes.

The following is a perfectly general expression for the modular constants (2.8) $$k^2 = \frac{\iint\left[\left(\frac{\partial J}{\partial \mu}\right)^2 + \left(\frac{\partial J}{\partial \nu}\right)^2\right]du\,dv}{\iint J^2\,du\,dv}$$

where the integration is extended over the area equal to $\pi$ and similar to the given cross-section of the tube. This formula is especially useful when the current distribution is unknown; assuming a reasonable distribution, it is possible to compute $k$ with reasonable accuracy.

*Propagation constants*

In a perfectly conducting tube the propagation constant of a plane wave is (3) $$\Gamma = i\omega\sqrt{\mu\epsilon}(1-\nu^2)^{\frac{1}{2}} = \frac{i\omega}{v}(1-\nu^2)^{\frac{1}{2}}$$

where $\nu$ is the ratio of the cut-off frequency to the applied frequency.

The phase velocity is higher than that of light and the group velocity is lower, in fact, (3.1) phase velocity $= v(1-\nu^2)^{-\frac{1}{2}}$ (3.2) group velocity $= v\sqrt{1-\nu^2}$ Both velocities approach the velocity of light as the frequency increases.

*Attenuation constants*

If the tube is not perfectly conducting, a certain amount of energy is dissipated in heat and waves become attenuated although their velocities remain practically unaffected except in the immediate vicinities of the cut-off frequencies. The attenuation constants for circular and rectangular tubes are given below.

Circular tubes

For all TM waves (4) $\quad \alpha = \dfrac{R_p}{\eta a}(1-\nu^2)^{-\frac{1}{2}}$ nepers/cm.

where $R_p$ is the intrinsic resistance of the tube. The intrinsic resistance of a metal is the real part of its intrinsic impedance; thus $$R_p = \sqrt{\dfrac{\pi \mu_p f}{g_p}}.$$

where $\mu_p$ and $g_p$ are respectively the intrinsic conductance in mhos/cm. and the intrinsic inductance in henries/cm. The quantity $$\eta = \sqrt{\dfrac{\mu}{\epsilon}}$$

is the intrinsic impedance of the dielectric; for air it is nearly 377 ohms.

For TE waves of order $n$ (4.1) $\quad \alpha = \dfrac{R_p}{\eta a}\left(\dfrac{n^2}{k^2-n^2}+\nu^2\right)(1-\nu^2)^{-\frac{1}{2}}$ nepers/cm.

Rectangular tubes

For TM waves in the $(m,n)$-mode, (4.2) $\quad \alpha = \dfrac{R_p(p^3m^2+n^2)}{\eta b(p^2m^2+n^2)}(1-\nu^2)^{-\frac{1}{2}}$ If the rectangle becomes a square, $p=1$ and (4.3) $\quad \alpha = \dfrac{R_p}{\eta a}(1-\nu^2)^{-\frac{1}{2}}$ If $b \to 0$ and $a$ remains constant, then (4.4) $\quad \alpha \to \dfrac{R_p}{\eta b}(1-\nu^2)^{-\frac{1}{2}}$ For TE waves (4.5) $\quad \alpha = \dfrac{R_p}{\eta b}\left[\dfrac{p(pm^2+n^2)}{p^2m^2+n^2}(1-\nu^2)+(1+p)\nu^2\right](1-\nu^2)^{-\frac{1}{2}}$ Here if $n \neq 0$, $b \to 0$ and $a$ remains constant, (4.6) $\quad \alpha \to \dfrac{R_p}{\eta}\left[\dfrac{1-\nu^2}{a}+\dfrac{\nu^2}{b}\right](1-\nu^2)^{-\frac{1}{2}}$ on the other hand, if $n=0$, $b \to 0$, and $a$ remains constant (4.7) $\quad \alpha \to \dfrac{R_p}{\eta b}(1-\nu^2)^{-\frac{1}{2}}$ In general, for the mode of propagation with the lowest cut-off frequency $(n=0)$, (4.8) $\quad \alpha = \dfrac{R_p}{\eta b}(1+p\nu^2)(1-\nu^2)^{-\frac{1}{2}}$ If the cross-section is a square, then for all modes of propagation (4.9) $\quad \alpha = \dfrac{R_p}{\eta a}(1+\nu^2)(1-\nu^2)^{-\frac{1}{2}}$

Tubes of any shape

For TM waves (4.10) $\quad \alpha = \dfrac{R_p \int |\mathrm{grad}\ J|^2 ds}{2\eta \int\int |\mathrm{grad}\ J|^2 dS}(1-\nu^2)^{-\frac{1}{2}}$ nepers/cm where $J$ is the density of the longitudinal displacement current, $R_p$ the intrinsic resistance of the conductor, and $\eta$ the intrinsic impedance of the dielectric.

For TE waves (4.11) $\quad \alpha = \dfrac{R_p}{2\eta}\left[(1-\nu^2)\dfrac{\int|\mathrm{grad}\ M|^2 ds}{\int\int|\mathrm{grad}\ M|^2 dS}+\dfrac{\chi^2\nu^2 \int M^2 ds}{\int\int M^2 dS}\right](1-\nu^2)^{-\frac{1}{2}}$ in nepers per centimeter, where $M$ is the magnetic current density.

It is important to note that for circular electric waves, the attenuation constant as given by (4.1), becomes (4.12) $\quad \alpha = \dfrac{R_p}{\eta a}\nu^2(1-\nu^2)^{-\frac{1}{2}}$ Since $R_p$ increases as the square root of the frequency, the attenuation goes down as the three halves' power of the frequency.

Characteristic impedances

The characteristic impedance ($Z_0$) of a tube to a transverse magnetic wave will be so defined as to make the average power transmitted through the tube equal to one-half of the real part of the following energy flux function (5) $\quad F = Z_0 I^2$ where $I$ is the "effective" displacement current through the tube. By effective current is meant the square root of the mean square of the longitudinal current density $(J)$ multiplied by the area of the cross-section, that is, (5.1) $\quad I = S\sqrt{\dfrac{1}{S}\int\int J^2 dS}$ Similarly, the characteristic admittance ($Y_0$) of the tube to a transverse electric wave will be so defined as to make the average power transmitted through the tube equal to one-half of the real part of the energy flux function (5.2) $\quad F = Y_0{}^* C^2$ where $C$ is the "effective" magnetic current (measured in volts) through the tube and $Y_0{}^*$ is a complex number conjugate to $Y_0$. By effective current is meant the square root of the mean square of the longitudinal magnetic current density $(M)$ multiplied by the area of the cross-section, that is, (5.3) $\quad C = S\sqrt{\dfrac{1}{S}\int\int M^2 dS}$ The characteristic impedance may be defined also in reference to the "effective" conduction current $I_p$ in the tube. This effective conduction current is defined as the square root of the mean square of the linear conduction current density $(J_p)$ multiplied by the length of the circumference of the tube (5.4) $\quad I_p = l\sqrt{\dfrac{1}{l}\int J_p{}^2 dl}$ The relation between $I$ and $I_p$ is given by the following equation:

(5.5) $\quad \dfrac{I^2}{I_p{}^2} = \dfrac{\pi k^2 \int\int |\mathrm{grad}\ J|^2 dS}{l \int |\mathrm{grad}\ J|^2 dl}$ This definition of impedance is more convenient to use than the first one in designing a coaxial pair whose impedance matches that of a single tube. The former definition can be used with equal facility, however, if it is imagined that at the junction between the coaxial pair and the tube there is an ideal transformer with the ratio given by the last equation.

Similarly, for transverse electric waves, (5.6) $\quad \dfrac{C^2}{I_p{}^2} = \dfrac{S\int\int M^2 dS}{l\left[\dfrac{1-\nu^2}{\eta^2\chi^4}\int|\mathrm{grad}\ M|^2 dl + \dfrac{1}{\omega^2\mu^2}\int M^2 dl\right]}$ or (5.7) $\quad \dfrac{C^2}{I_p{}^2} = \dfrac{\pi k^2\mu^2\omega_c^2 \int\int M^2 dS}{l[(1-\nu^2)\int|\mathrm{grad}\ M|^2 dl + \chi^2\nu^2\int M^2 dl]}$ The characteristic impedance offered by a tube of arbitrary shape to a transverse magnetic wave is (5.8) $$Z_o = \frac{\eta\sqrt{1-\nu^2}}{\pi k^2} \text{ ohms}$$

Similarly, for transverse electric waves, $$Y_o = \frac{\sqrt{1-\nu^2}}{\pi k^2 \eta} \text{ mhos}, \quad Z_o = Y_o^{-1} = \frac{\pi k^2 \eta}{\sqrt{1-\nu^2}} \text{ ohms}$$

In the special case of a circular tube, the following expression applies:

(5.10) $$Z_o = \frac{\eta\sqrt{1-\nu^2}}{4\pi} \text{ ohms}$$

for the characteristic impedance to a transverse magnetic wave when referred to the effective conduction current; and (5.11) $$Z_o = \frac{\eta}{4\pi} \cdot \frac{\sqrt{1-\nu^2}}{\frac{n^2}{k^2-n^2}+\nu^2} \text{ ohms}$$

for the characteristic impedance to a transverse electric wave.

Resistance termination of tubular guides

Where it is desired to produce progressive waves in a finite guide, the guide should be so terminated at the far end that no reflections take place. The proper termination may be a transverse film of uniform thickness tightly fitting across the guide. The thickness of the film can be shown to be (6) $$h = \frac{1}{\eta g}(1-\nu^2)^{-\frac{1}{2}} \text{ cms.}$$

for transverse magnetic waves, and (6.1) $$h = \frac{\sqrt{1-\nu^2}}{\eta g} \text{ cms.}$$

for transverse electric waves, where $g$ is the intrinsic conductance of the material comprising the film, expressed in mhos per centimeter.

In the specific case where the film is a circular disc, the above equations may be replaced by more practical equations giving the direct current resistance between the periphery of the disc and some concentric electrode. Thus, the resistance of the disc for terminating transverse magnetic waves should be (6.2) $$R = \frac{60 \log \frac{a}{b}}{\sqrt{\epsilon_s}}\sqrt{1-\nu^2} \text{ ohms}$$

where $a$ is the radius of the tube, that is, of the periphery of the disc; $b$, the radius of the inner electrode; and $\epsilon_s$, the dielectric constant of the medium in the tube in electrostatic units.

For transverse electric waves, the direct current resistance should be (6.3) $$R = \frac{60 \log \frac{a}{b}}{\sqrt{\epsilon_s}}(1-\nu^2)^{-\frac{1}{2}} \text{ ohms}$$

In order that the disc may terminate the guide properly it is necessary that the impedance beyond the disc, i. e., in the direction of propagation, be very high; theoretically, it should be infinite. Unbounded space has a finite impedance that would effectively shunt the disc and disturb the impedance match if the termination disc were simply a cap over the end of the guide. Theoretically, a perfect anti-conducting disc or cap immediately beyond the terminating disc would provide the desired infinite impedance. Such a disc would have to have, theoretically, infinite permeability and infinite radial impedance.

A practical infinite impedance structure is a quarter wave-length section of guide closed at the end by a reflector, for example, a transverse conducting disc or cap. This combination is represented in Fig. 17, where the tubular guide 1 is provided with a transverse resistive disc 20 of optimum thickness spaced a quarter wave-length, or any odd multiple thereof, from the copper cap 21 which closes the end of the guide. With this combination all of the guided wave energy is absorbed in the disc 20 without reflection.

Figure 18:
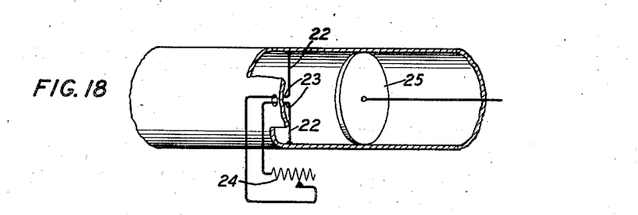

Another type of resistive termination for a dielectric guide, one proposed heretofore, comprises a fine diametral wire of a critical, high resistance. An improved termination of this general type, in accordance with this invention, is illustrated in Fig. 18. The diametral wire 22 may be a copper wire of relatively large diameter, one millimeter, e. g., which is connected at its ends to the wall of the guide and which is broken at an intermediate point for connection through leads 23 to an external load 24 of adjustable resistance. The load 24 may be a variable resistor, the input impedance of a receiving circuit, or the output impedance of a sending terminal circuit. Beyond the diametral wire and about a quarter-wavelength therefrom is a conducting piston 25 which serves as a reflector.

By simultaneous adjustment of piston 25 and resistance 24, a condition may be reached where the efficiency of energy transfer between the wave guide and resistance 24 is a maximum. Wire 22 should be adjusted also to lie in a plane of polarization of the electric field where it is used as a receiving circuit termination.

One advantage of the large diameter transverse wire is that it does not have the high inductance of a fine wire and it is therefore well adapted for operation over a wide band of frequencies.

Transmission equations

The "effective" transverse electromotive force (voltage) will be defined as the square root of the mean square of the potential over the entire cross-section of the tube. In terms of this voltage V and current I, transmission equations for transverse magnetic waves become (7) $$\frac{dV}{dz} = -\left[\frac{i\omega\mu}{\pi k^2} + \frac{1}{(g+i\omega\epsilon)S}\right]I$$

(7.1) $$\frac{dI}{dz} = -\pi k^2 (g+i\omega\epsilon)V$$

Thus, insofar as transmission of transverse magnetic waves is concerned, a single tube can be regarded as a structure with continuously distributed series inductance and series capacity.

(7.2) $L = \frac{\mu}{\pi k^2}$ henries/cm., $C = \epsilon S$ farad-cms.

and continuously distributed shunt capacity, (7.3) $\quad C = \pi k^2 \epsilon$ farads-cm.

Similarly, the "effective" transverse magnetomotive force (amperage) will be defined as the square root of the mean square of the magnetic potential throughout the cross-section of the tube. In terms of this amperage A and the effective current C, the transmission equations for transverse electric waves can be written as follows:

(7.4) $$\frac{dA}{dz} = -\left[\frac{g+i\omega\epsilon}{\pi k^2} + \frac{1}{i\omega\mu S}\right]C$$

$$\frac{dC}{dz} = -i\omega\mu\pi k^2 A$$

Hence, insofar as transmission of transverse electric waves is concerned, the tube can be regarded as a structure with continuously distributed series inductance (7.5) $\quad L = \pi k^2 \mu$ henries/cm.

and continuously distributed shunt capacity and inductance (7.6) $\quad C = \dfrac{\epsilon}{\pi k^2}$ farads /cm., $L = \mu S$ henry-cms.

Relations between the field components

Let $E_t$ and $H_t$ be respectively the transverse components of the electromotive and magnetomotive intensities and $E_z$ and $H_z$, the longitudinal components. Then, for transverse magnetic waves, (8) $\quad E_t = \dfrac{\Gamma}{g + i\omega\epsilon} H_t, \; H_t = -\chi^{-2} \text{ grad } J, \; E_z = \dfrac{J}{g + i\omega\epsilon}$ If the dielectric inside the tube is perfect, then (8.1) $\quad E_t = \eta \sqrt{1 - \nu^2} H_t, \; H_t = -\chi^{-2} \text{ grad } J, \; E_z = \dfrac{J}{i\omega\epsilon}$ Similarly, for transverse electric waves, (8.2) $\quad H_t = \dfrac{\Gamma}{i\omega\mu} E_t, \; E_t = \chi^{-2} \text{ grad } M, \; H_z = \dfrac{M}{i\omega\mu}$ and if the dielectric inside the tube is perfect, (8.3) $\quad H_t = \dfrac{\sqrt{1 - \nu^2}}{\eta} E_t, \; E_t = \chi^{-2} \text{ grad } M, \; H_z = \dfrac{M}{i\omega\mu}$

Circular magnetic waves

Out of an infinite variety of waves capable of traveling in circular tubes, there are a few that deserve special attention. One of these is the circular magnetic wave, in which the lines of magnetomotive intensity are circles, coaxial with the tube, and lines of electromotive intensity are located in axial planes. Any axial plane is a plane of symmetry for this wave.

The lowest cut-off frequency for the circular magnetic wave is (9) $\quad f_c = \dfrac{2.4v}{2\pi a}$ and the corresponding wave-length (appropriate to the dielectric of the tube)

(9.1) $\quad \lambda_c = \dfrac{2\pi a}{2.4} = 0.417(2\pi a) = 2.62a$

Its attenuation constant (9.2) $\quad \alpha = \dfrac{R_p}{\eta a}(1 - \nu^2)^{-\frac{1}{2}}$ nepers/cm.

becomes ultimately (9.3) $\quad \alpha = \dfrac{R_p}{\eta a}$

Figures 19, 19A, 19B:
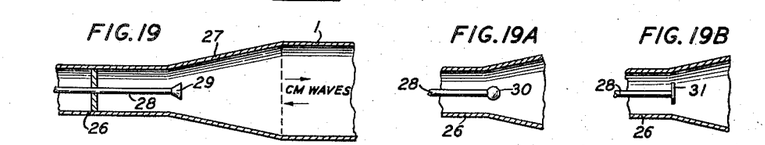
Figs. 19, 19A, 19B and 23 show means for interconnecting and matching the impedances of a coaxial conductor pair and a dielectric guide.

Looking from a coaxial pair the impedance of the circular magnetic wave is (9.4) $\quad Z_o = \dfrac{\eta}{4\pi}\sqrt{1 - \nu^2}$ ohms In air this becomes (9.5) $\quad Z_o = 30\sqrt{1 - \nu^2}$ ohms Circular magnetic waves in a cylindrical tube can be started by placing a circular disc against one end of the tube and applying an alternating potential difference between the edge of this disc and the edge of the pipe. An alternative structure is shown in Fig. 19, where the outer conductor 26 of a coaxial conductor pair is connected through a conical member 27 to the conducting tube 1 comprising the guide. The central conductor 28 of the coaxial pair may be terminated at the smaller end of the conical member 27 in any one of several ways. Fig. 19 shows a rudimentary outwardly-flaring cone 29 of conducting material; Fig. 19A shows a spherical termination 30; and Fig. 19B shows a transverse coaxial disc 31. In each case the size of the terminating member may be varied so that no standing waves can be detected in the guide 1. The combinations disclosed therefore function also as impedance matching couplings.

Figure 20:
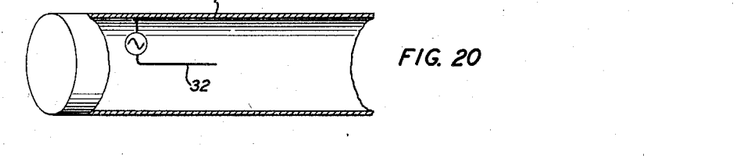
Figs. 20, 21 and 22 represent terminal structures adapted for use with circular magnetic waves.
Figure 21:
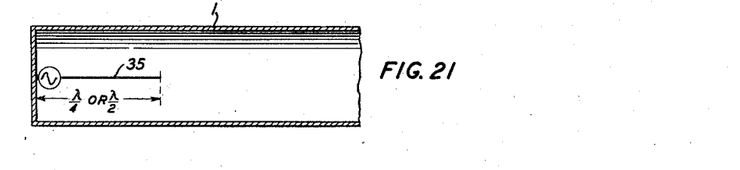

Other suitable CM wave terminals are shown in Figs. 20 to 23, inclusive. In Fig. 20 one terminal of the signal source is connected to a short length of wire 32 axially positioned with respect to the guide and the other terminal is connected by a radial wire to the wall of the guide. A modification is shown in Fig. 21 where the signal source is located at the end of the guide, one terminal being connected to the center of the disc closing the end of the guide and the other terminal being connected to an axial wire 35. The wire 35 is preferably either a quarter-wavelength or a half-wavelength. If it is a quarter-wavelength a low impedance is presented to the signal source; if it is a half-wavelength its impedance is high. In either case the impedance of the signal source should be matched with the impedance presented.

Figure 22:
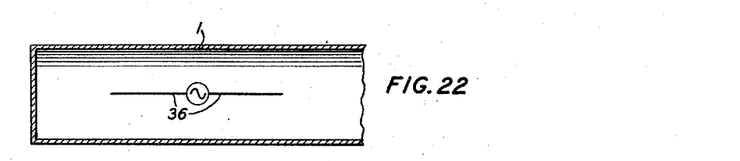

Fig. 22 shows schematically a balanced CM wave terminal comprising two axial wires 36 extending in both directions from the signal source. The position of the terminal from the closed end of the guide should be adjusted so that the energy of the guided wave is a maximum.

Figure 23:
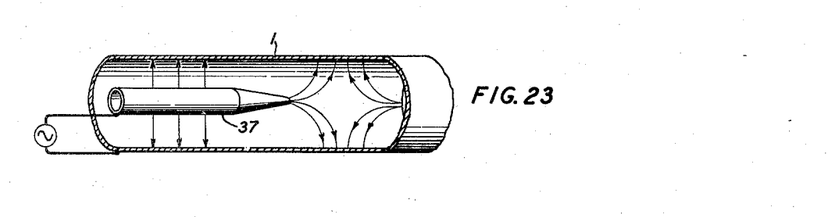

Fig. 23 shows one manner of associating a coaxial conductor transmission line with a CM guided wave system. Tubular conductor 1 serves both as a dielectric guide and as the outer conductor of the coaxial line. The central conductor 37 of the coaxial line is tapered to a blunt end, or it may be surmounted with a sphere or disc as shown in Figs. 19A and 19B, in each case the dimensions being so chosen as to effect an impedance match between the coaxial line and the dielectric guide. The impedance of the coaxial line is itself capable of a wide range of adjustment, since it varies with the relative diameters of the two conductors. Fig. 23 may, therefore, be considered illustrative of a combination in which the ratio of the internal diameter of the outer conductor to the outer diameter of the central conductor is such as to match the impedance of the guide to CM waves.

Circular electric waves

The next special wave is the circular electric wave in which the lines of electromotive intensity are circles, coaxial with the tube, and lines of magnetomotive intensity are located in axial planes. This wave is also symmetric with respect to any axial plane.

The lowest cut-off frequency for the circular electric wave is (10) $\quad f_c = \dfrac{3.83}{2\pi a} = 0.610\dfrac{v}{a}$ and the corresponding wave-length (10.1) $\quad \lambda_c = \dfrac{2\pi a}{3.83} = 0.261(2\pi a) = 1.64a$ The attenuation constant for this wave is given by (10.2) $\quad \alpha = \dfrac{R_p}{\eta a}\nu^2 (1 - \nu^2)^{-\frac{1}{2}}$ nepers/cm.

and at sufficiently high frequencies, by (10.3) $\quad \alpha = \dfrac{R_p}{\eta a}\nu^2$ A very significant characteristic of the circular electric wave is that the attenuation falls off as the frequency is increased.

Circular electric waves can be started in a tube by means of a circular current path coaxial with and transverse to the tube. The amount of energy transferred from this path to the wave will depend, of course, on the position of the path, that is, on its size. The greatest transfer of energy is obtained with the current path placed in the region of maximum electric intensity. The electric intensity in a circular electric wave varies in the radial direction as $J_1(\rho/a)$ between zero and, for the fundamental mode, 3.83. This function passes through a maximum at 1.84, which is 0.48 of the radius of the guide from the axis of the guide. Hence the optimum diameter of the current path is 0.48 of the diameter of the guide.

A simple loop of wire is not recommended for the production of circular electric waves because of phase change in the current traversing the loop. Some means is desired, therefore, for insuring that the current in the loop is substantially in phase at all points. A suitable arrangement is shown in Fig. 24 where a plurality of arcuate conducting wires 40 are connected in parallel through radial connectors 41 to the terminals of the signaling source S. Alternatively, the connectors may be brought out parallel to the axis of the guide for connection to the source. Preferably, the length of each arcuate member is one-sixth of a wave-length or less. If the lengths are greater there is a strong tendency for waves other than circular electric waves to be generated.

As further insurance against the production of waves other than circular electric waves, a plurality of exciting current loops of different diameters may be provided, each of them supplied with current of phase and intensity appropriate to the region of the guide in which they are placed. Thus, for circular electric wave of fundamental mode the currents in all of the loops would be in phase and graduated in amplitude in accordance with the function $J_1(\rho/a)$, maximum, that is, in the loop having a diameter 0.48 of the diameter of the guide and diminishing in loops of both greater and lesser diameter.

In the terminal structure shown schematically in Fig. 25 an approach to the desired distribution of the exciting field is made by providing two current loops in addition to the one of 0.48 diameter shown in Fig. 24. In each current loop the arcuate members 42, 43, 44 are connected in series with signal source S through phase shifting, radial loops 45 of suitable lengths, these loops being represented schematically in the drawing by dotted lines. The series connection of the arcuate members results in greater impedance than would be obtained by the parallel connection shown in Fig. 24. To secure the required current amplitudes in the three current loops any suitable means may be provided for regulating or fixing the respective resistances or applied voltages. For purposes of illustration the several loops are shown connected across different portions of a voltage divider 46.

Figure 26A:
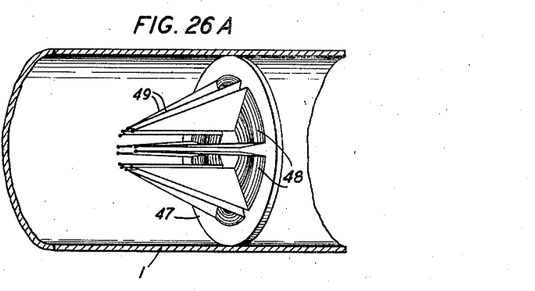

An alternative structure is represented in Figs. 26 and 26A where a transverse disc 47 of insulating material is coated in a plurality of sectorial areas with a thin layer 48 of conducting material. The resistance of the coating varies in a radial direction in such manner that with a voltage applied between the radial edges of each sectorial plate the greatest current flows in the arcuate path corresponding to maximum electric intensity in the guided wave, and the current flowing in the other arcuate paths varies from this maximum in accordance with $J_1(\rho/a)$. Again the arcuate dimensions of the plates should be small in comparison with the wave-length. A sputtered coating of varying thickness may be utilized to obtain the required variations in resistance.

To connect the sectorial members 48 with the source, conducting plates 49 lying in radial planes and tapering in width from the radial dimension of the sectorial members to a size suitable for connection to ordinary wires may be used, as illustrated in Fig. 26A. Various specific arrangements of the connecting members will be obvious from the preceding discussion of Figs. 24 and 25.

In a broad aspect, the principle underlying the structures shown in Figs. 25, 26 and 26A is to provide an exciting field that at every point in the vicinity of the terminal is of magnitude, phase and direction appropriate for only the specific kind of wave it is desired to set up. In a negative aspect, an exciting force may be set up in a region corresponding to a node of a wave it is desired to inhibit.

*Plane waves of the first order*

Fig. 5 illustrates for both transverse magnetic and transverse electric waves the equipotential lines for plane waves of the first order traveling in the first mode. The equipotential lines are those of electric potential for transverse magnetic waves and of magnetic potential for transverse electric waves. The lines of electric potential are also the lines of magnetomotive intensity and the lines of magnetic potential are, at the same time, the lines of electromotive intensity. The figure shows the fields of a transverse magnetic wave and of a transverse electric wave in tubes whose cross-sections are shown respectively by the solid and the dotted circles. The radii of the two circles are in the ratio 1.84 to 3.83.

It has been observed that in TM sectorial waves there are one or more pairs of axes parallel to the axis of the guide along which the electric intensity is a maximum, the lines of force being distributed much as they would be between wires positioned along these axes. In a TM wave of the first order traveling in the first mode there is one such pair of axes.

Figure 27:
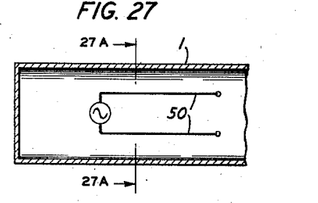
Figs. 27 to 30, inclusive, are illustrative of means for generating and receiving sectorial guided waves.
Figure 27A:
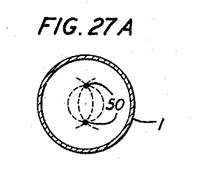

In accordance with one feature of the invention a terminal structure is provided that is characterized by wires lying along the axes of a sectorial wave. One embodiment is shown in Figs. 27 and 27A. In this example two short wires 50 are provided each lying along one of the axes of a TM wave of first order and first mode, and the signal source is connected to the ends nearest the end of the guide. The guide being circular in cross-section the distances of the wave axes from the axis of the guide, and therefore the distances of the wires from the axis of the guide, are given by the roots of the equation $J_1'(\chi\rho)=0$, where $J_1(\chi a)=0$. Here $a$ is the radius of the guide and $\rho$ is the optimum distance of the wires 50 from the axis. In this specific example each wire is 0.63 of the radius of the guide from the axis.

An extension of the principles last described permits the direct connection of two-wire lines and dielectric guides. Thus in Fig. 28 where a transmission line or circuit 52 comprising a shielded pair of conductors is connected to a section of line 53 of greater diameter through a section of gradually changing dimensions, the two conductors comprising the shielded pair are extended along the axes of a TM wave of first order and first mode to serve as a guided wave terminal structure. The tubular conductor 1 comprising the guide may be an extension of the enlarged shield 56 of the shielded pair, and of the same or different conducting material. The spacing discs 55 are of insulating material. The conductors 54 may be surmounted by small spheres to facilitate impedance matching as described with reference to Figs. 19, 19A and 19B.

Figure 29:
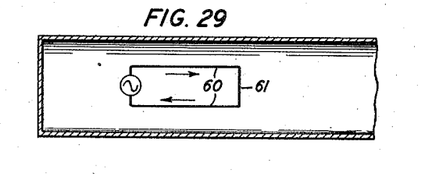
Figure 30:
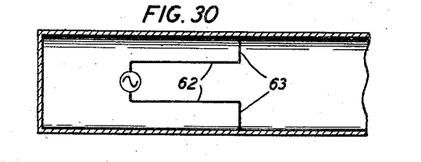

The existence of axes in sectorial waves makes possible the use of TE wave terminals of the type illustrated in Figs. 29 and 30. These terminals are specifically adapted for TE waves of the first order and first mode. In the embodiment shown in Fig. 29 the signal source is connected to two conductors 60 each lying along one of the axes of the wave. A transverse conductor 61 connects their ends. In the embodiment shown in Fig. 30, the conductors 62, similarly, are positioned along respective axes and their terminals are connected to the guide by respective radial connectors 63. While the several conductors may be ordinary wires it is better if they are strip-like, for the wider the strip the more nearly is the current in phase over its length, a condition favorable to the production of TE waves.

With reference to the combinations illustrated in Figs. 20, 22, 27, 29 and 30, it may be said that the distance of the source or receiver from the end of the guide, the length of the axial conductors and the impedance of the source should be so correlated as to yield maximum efficiency in the transfer of energy between the source or receiver and the guide. Practically speaking, the impedance of the source or receiver should be adjusted to match the impedance presented by the terminal structure associated with it, and the axial position of the terminal adjusted to minimize or eliminate standing waves in its vicinity.

It is to be understood that wherever in this specification reference is made to a signal source or a sending terminal, the combination described is adapted also for the substitution of a signal receiver or receiving terminal, respectively.

The lowest cut-off frequency for the TM wave is:

(11) $$f_c = \frac{3.83v}{2\pi a} = 0.610 \frac{v}{a}$$

and for the transverse electric wave (11.1) $$f_c = \frac{1.84v}{2\pi a} = 0.293 \frac{v}{a}$$

The corresponding wave-lengths are (11.2) $$\lambda_c = \frac{2\pi a}{3.83} = 0.261(2\pi a) = 1.64a$$

and (11.3) $$\lambda_c = \frac{2\pi a}{1.84} = 0.546(2\pi a) = 3.41a$$

The attenuation constants of the two waves are correspondingly (11.4) $$\alpha = \frac{R_p}{\eta a}(1-\nu^2)^{-\frac{1}{2}} \text{ nepers/cm.}$$

and (11.5) $$\alpha = \frac{R_p}{\eta a}(0.42+\nu^2)(1-\nu^2)^{-\frac{1}{2}} \text{ nepers/cm.}$$

At sufficiently high frequencies these become (11.6) $$\alpha = \frac{R_p}{\eta a}$$

and (11.7) $$\alpha = .42 \frac{R_p}{\eta a}$$

*Plane waves of the second order*

In Fig. 6, showing the cross-section of waves of the second order, the equipotential lines are those of electric potential in the transverse magnetic wave and of magnetic potential in the transverse electric wave. This figure represents the transverse magnetic wave in the tube whose cross-section is shown by the solid circle and the transverse electric wave in the tube shown by the dotted circle.

The lowest cut-off frequencies for the transverse magnetic wave and the transverse electric wave are respectively (12) $$f_c = \frac{5.14v}{2\pi a} = 0.818 \frac{v}{a}$$

and (12.1) $$f_c = \frac{3.054v}{2\pi a} = 0.486 \frac{v}{a}$$

The corresponding wave-lengths are, then, (12.2) $$\lambda_c = \frac{2\pi a}{5.14} = 0.195(2\pi a) = 1.22a$$

and (12.3) $$\lambda_c = \frac{2\pi a}{3.054} = 0.327(2\pi a) = 2.06a$$

The attenuation constants for the two waves are, in general (12.4) $$\alpha = \frac{R_p}{\eta a}(1-\nu^2)^{-\frac{1}{2}} \text{ nepers/cm.}$$

and (12.5) $$\alpha = \frac{R_p}{\eta a}(0.480+\nu^2)(1-\nu^2)^{-\frac{1}{2}} \text{ nepers/cm.}$$

For sufficiently high frequencies, (12.6) $$\alpha = \frac{R_p}{\eta a}$$

and (12.7) $$\alpha = 0.480 \frac{R_p}{\eta a}$$

The following is a list of the basic symbols employed in this specification:

$g$, intrinsic conductance in mhos/cm,
$\epsilon$, intrinsic capacity in farads/cm,
$\mu$, intrinsic inductance in henries/cm,
$f$, frequency in cycles/sec,
$\omega = 2\pi f$,
$i\omega\mu$, intrinsic reactance in ohms/cm,
$g + i\omega\epsilon$, intrinsic admittance in mhos/cm, $\eta = \sqrt{\frac{i\omega\mu}{g+i\omega\epsilon}}$, intrinsic impedance in ohms, $\eta = \sqrt{\frac{\mu}{\epsilon}}$, the intrinsic impedance of a perfect dielectric; in air $\eta = 120\pi = 377$ ohms, $g_p, \mu_p, \eta_p$, the intrinsic constants of a metallic pipe, $\eta_p = \sqrt{\frac{i\omega\mu_p}{g_p}} = \sqrt{\frac{\eta\mu_p f}{g_p}}(1+i)$, $R_p = \sqrt{\frac{\pi\mu_p f}{g_p}}$, the intrinsic resistance of a metallic pipe in ohms, $f_c$, the cut-off frequency, $\nu = \frac{f_c}{f}$, ratio of the cut-off frequency to the applied frequency.

Certain subject-matter herein disclosed but not claimed is disclosed and claimed in my pending application Serial No. 164,473, filed September 18, 1937.

What is claimed is:

1. In combination, a transmission line comprising a pair of wires within a tubular metallic shield, a tandem-connected wave guide consisting of a tubular metallic pipe integral with and of the same diameter as said shield, said pair of wires being open-ended at the junction of said line and guide, and means for energizing said transmission line at a frequency so high that electromagnetic waves are detached from said wires at said junction and propagated along and within said guide, said wires lying in respective regions of maximum longitudinal electric intensity in said electromagnetic waves.

2. In a high frequency transmission system, a transmission line comprising a plurality of conducting wires and a metallic sheath surrounding said wires, a wave guide consisting of a metallic pipe connected in tandem with said transmission line, said wires being open-ended at the point of tandem connection, and means for producing a sectorial transverse magnetic wave in said guide, said wires being so positioned as to coincide with respective axes of said sectorial wave in which the longitudinal electric field intensity is maximum.

3. In combination, a conduction current transmission line having a metallic sheath and at least two current-carrying conducting wires enclosed thereby, and a tandem-connected wave guide consisting of an elongated body of dielectric having a lateral boundary substantially continuous with said sheath, each of said conducting wires projecting into said wave guide in such position with reference to the geometric axis of said guide as to coincide with a natural axis of an electromagnetic wave in said wave guide.

4. In combination with a uni-conductor wave guide comprising a metallic pipe, a terminal for guided waves of the transverse magnetic type comprising an open-ended, transversely spaced pair of conductors lying within the guide and parallel to the axis thereof, said conductors lying along respective axes of said waves.

5. In combination with a uni-conductor wave guide comprising a metallic pipe, a terminal for guided waves of the transverse magnetic type comprising an open-ended, transversely spaced pair of conductors lying within the guide and parallel to the axis thereof, and a translating device electrically connected across said pair of conductors, the distance between the point of connection of said device and the open end of said line being optimum for impedance match between said device and said guide.

6. In combination with a wave guide comprising a metallic pipe, means for generating or receiving in said pipe electromagnetic waves of the transverse electric type comprising a pair of laterally spaced conductors lying within the guide and parallel to the axis thereof, a translating device electrically connected to one end of said pair and short-circuiting means at the other end.

7. In combination with a wave guide carrying electromagnetic waves of a character such that the guide presents to them the characteristics of a high-pass filter, a terminal structure for launching or receiving said waves comprising a parallel conductor pair disposed lengthwise within said guide, and a translating device operatively connected to one end of said pair, the length of said pair being optimum for maximum efficiency in the transfer of energy between said translating device and said guide.

8. In combination with a wave guide carrying electromagnetic waves of a character such that the guide presents to them the characteristics of a high-pass filter, a terminal structure for launching or receiving said waves comprising a parallel conductor pair disposed lengthwise within said guide, the conductors of said pair lying along respective axes of said waves.

9. In combination with a wave guide carrying electromagnetic waves of a character such that the guide presents to them the characteristics of a high-pass filter, a terminal structure for launching or receiving said waves comprising a parallel conductor pair disposed lengthwise within said guide, each of the conductors comprising said conductor pair being substantially in registry with a respective region of maximum longitudinal field intensity in said waves.

SERGEI A. SCHELKUNOFF.